May 30, 1933.  A. C. GILBERT  1,912,350
BEVERAGE MIXER
Filed June 4, 1931  2 Sheets-Sheet 1

Inventor
Alfred C. Gilbert
By Rockwell Bartholow
Attorneys

May 30, 1933.  A. C. GILBERT  1,912,350
BEVERAGE MIXER
Filed June 4, 1931   2 Sheets-Sheet 2
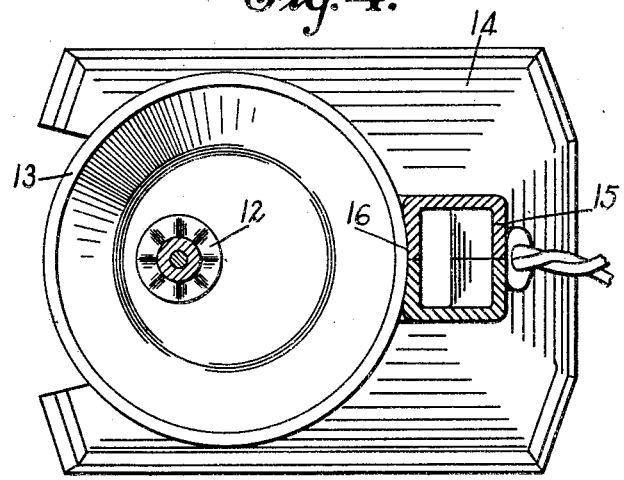
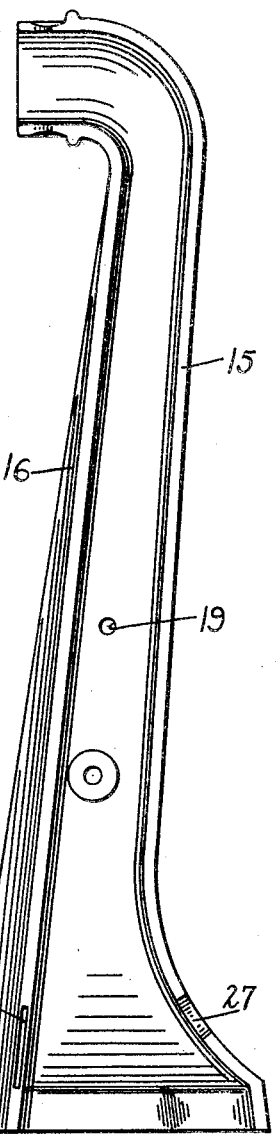
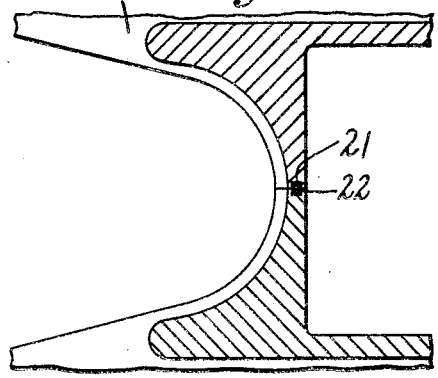
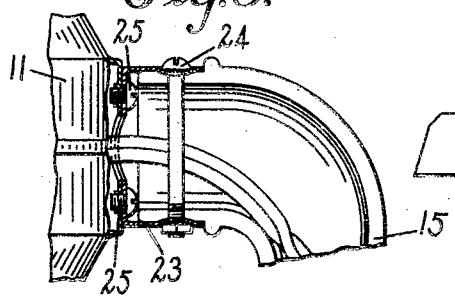
Inventor
Alfred C. Gilbert
By Rockwell Barthalow
Attorneys Patented May 30, 1933

1,912,350

UNITED STATES PATENT OFFICE

ALFRED C. GILBERT, OF NORTH HAVEN, CONNECTICUT, ASSIGNOR TO THE A. C. GILBERT COMPANY, OF NEW HAVEN, CONNECTICUT, A CORPORATION OF MARYLAND

BEVERAGE MIXER

Application filed June 4, 1931. Serial No. 542,035.

This invention relates to beverage mixers, and more particularly to those used at soda fountains and at like places for preparing malted milk and other beverages.

One of the objects of my invention is to furnish an economical device of this character having a minimum number of parts and capable of production at very low cost, which is, nevertheless, very efficient and convenient in use.

Another object of the invention is to provide in a device of this class improved means for holding the receptacle in place while the liquid therein is being agitated.

To these and other ends the invention consists in the novel features and combinations of parts to be hereinafter described and claimed.

In the accompanying drawings:

Fig. 4 is a section on line 4—4 of Fig. 1;

Fig. 5 is a section on line 5—5 of Fig. 1;

Fig. 6 is a detail section showing the means for attaching the motor to the upper end portion of the stand;

Fig. 7 is a detail of one of the hollow sections of the stand, and

Figure 1:
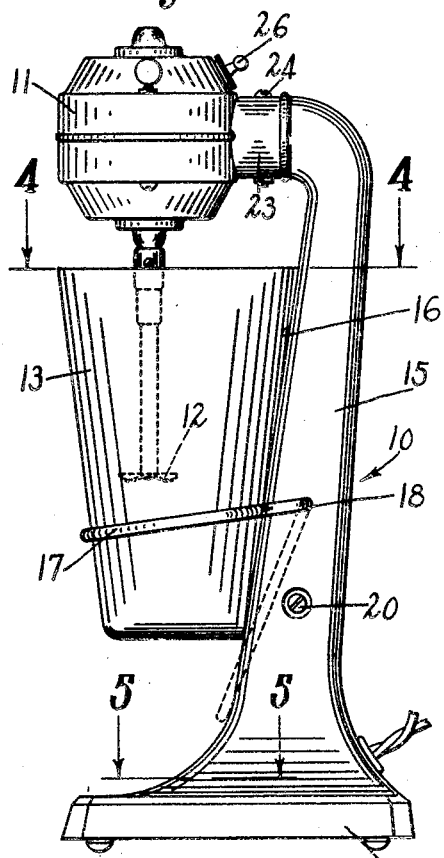
Fig. 1 is a side elevation of a beverage mixer constructed in accordance with the invention with the receptacle in position for mixing.
Figure 2:
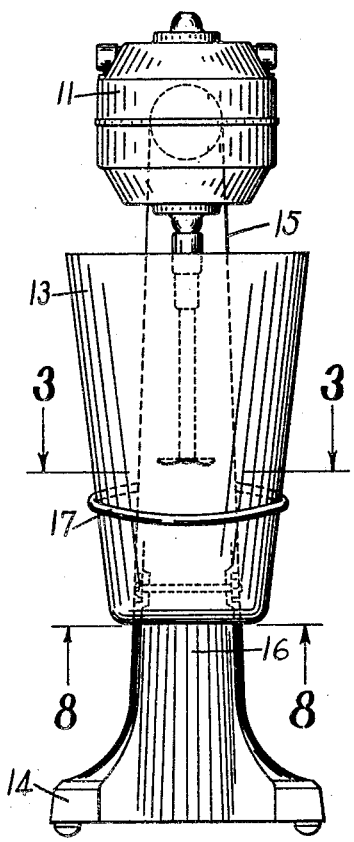
Fig. 2 is a view at right angles to Fig. 1.
Figure 3:
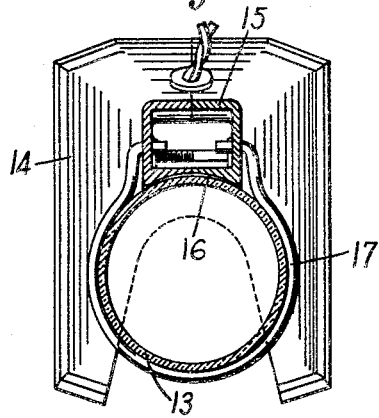
Fig. 3 is a section on line 3—3 of Fig. 2.
Figure 8:
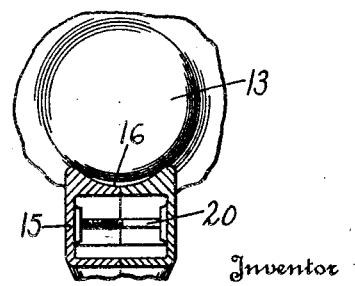
Fig. 8 is a section on line 8—8 of Fig. 2.

The invention relates more particularly to those mixing devices in which the receptacle, which can be made of glass, metal or other suitable material, is in general of inverted frustum shape, and in which the standard has an overhanging motor at the upper end and at the side a slanting portion which is in close proximity to the receptacle at one side of the latter, and has an inclination corresponding generally to that of the side wall of the receptacle. The invention relates particularly to improved and simplified means embodied in a construction of this kind for releasably holding the receptacle in the position in which the agitator on the motor shaft extends down into the liquid for stirring purposes.

In the drawings the stand generally is indicated at 10, the overhanging motor at 11, the motor-driven agitator or stirrer at 12, and the frustum-shaped receptacle at 13. In this particular case the receptacle is made of glass, but it might be made of metal if desired. It increases gradually in diameter from the lower portion to the upper portion and at its side rests against an adjacent upwardly and outwardly inclined supporting portion of the stand 10. A base 14 is a part of the stand and from this base rises a post or column 15, which in its entirety is slightly inclined upwardly and outwardly, and is provided with an upwardly and outwardly inclined inner face 16 disposed toward and in substantial contact with the receptacle. The receptacle 13 rests at its side against the inclined surface 16 in substantial contact therewith and is held in that position at a predetermined elevation by means adapted to embrace the receptacle in a zone intermediate of its upper and lower ends and to be swung into and out of operative position. This means in the present instance takes the form of a loop or bail 17 pivoted to the supporting post at 18.

Preferably the inclined supporting face 16 is curved in horizontal section throughout a substantial portion of its length so as to conform generally to the curvature of the side wall of the receptacle. The curvature of the supporting face at that portion of the stand adjacent the upper edge of the receptacle is shown in Fig. 4. At this point the curvature is quite slight and it increases gradually from this point to the bottom of the stand, i. e., to the lower part of the base, which is cut away at the front to present a fork-shaped portion below the receptacle.

The loop or bail 17 can be conveniently formed from a single piece of wire, the main portion of which is curved to conform generally to the curvature of the receptacle and follows the receptacle throughout the major part of its circumference. The end portions of the wire loop are disposed along the sides of the column 15 and the extremities are turned in to engage holes or sockets 19 in which such extremities are held by the resiliency of the wire. By engaging the ends of the loop in the holes 19, the loop is pivoted for swinging movement up and down and can be moved from the inoperative position shown in dotted lines in Fig. 1 to the operative position shown in full lines in that view, and vice versa.

Preferably, the principal part of the stand is made in two sections, one of which is shown in Fig. 7, the stand being hollow, and the meeting edges of the two sections being held in contact by a single fastening member, such as a bolt 20. One of the holes 19 is formed in one of the sections and the other hole in the other section, and these holes are disposed at the side faces of the column where the ends of the loop 17 can be readily sprung into the same. In order to permit a single fastening member 20 to be employed for holding the sections in assembled position, the meeting edges of the sections are provided with grooves 21 which register with each other and in which a pin or spline 22 is fitted in order to hold the two sections in alinement.

The motor 11 is attached to the upper horizontally turned end of the stand by a ferrule 23, which is attached to the stand by a bolt 24 and to the motor casing by screws 25, as shown in Fig. 6.

The switch 26 for starting and stopping the rotation of the motor may be located on the motor casing at a point near but slightly above the ferrule 23. The motor is supplied with current by conductors which pass into the stand at the lower portion thereof through an opening 27.

When the receptacle has been filled with liquid which is to be mixed, the receptacle is lifted up under the agitator shaft, and when elevated somewhat above the position shown in Fig. 1 is abutted laterally against the supporting surface 16 of the stand. The operator usually does this with his left hand. While the receptacle is held up in this manner with the left hand, the right hand is employed to raise the loop 17 so that it embraces the receptacle. The receptacle is then released and drops slightly so as to take the position shown in Fig. 1, in which position the loop holds it in contact with the column and maintains it against dislocation. The switch of the motor is then tripped and the rotation of the agitator commenced. After the mixing operation is completed, the switch is actuated to cut off the motor. The receptacle slightly raised, and upon this raising movement the loop 17 immediately drops by gravity to the inoperative position shown in dotted lines in Fig. 1. The receptacle can then be moved downwardly and laterally so as to clear the agitator.

One of the chief advantages of my device is its simple structure. The means for holding the receptacle in position against the supporting column is simple and inexpensive. It engages the receptacle by embracing it intermediate of its upper and lower ends and there is no necessity for engaging the receptacle at its upper and lower edges, as has been requisite in some devices of this character. On the other hand, it is unnecessary to provide the stand with a special stop for preventing the tipping of the receptacle out of an upright position, for the stand itself is of such construction as to prevent this tipping action when used in combination with my improved form of swinging receptacle-holding means. It is unnecessary for the swinging holding member to conform accurately to the curvature of the receptacle, and it need not extend all the way around the receptacle, and the provisions for pivoting the holding member to the stand involve a minimum number of parts. However, notwithstanding the simplicity of the device, its operation is very efficient.

Various changes can be made in the details of the structure without departing from the scope of the invention as defined in the claims.

What I claim is:

1. In a device of the character described, the combination of a generally inclined stationary support and a movable support between which the receptacle is sustained against downward movement, said supports engaging the receptacle exteriorly at substantially opposite parts of its periphery, the latter support being in the form of a member pivoted to the stationary support between the ends of the latter and movable upwardly to engage the receptacle and having a part which in the engaged position is in a horizontal plane intersecting the stationary support in a region where the latter engages the receptacle to support it.

2. In a device of the character described, a column presenting at one side an arc-shaped abutment for the inclined wall of a frustum-shaped receptacle, and a movable supporting member between which and said column the receptacle is adapted to be held in elevated position above the base of the device, said abutment engaging said receptacle at one part of its periphery and said movable supporting member engaging it at a substantially opposite part of its periphery and in a horizontal plane intersecting said abutment, said arc-shaped abutment being inclined to the vertical and said movable supporting member being arranged to hold the receptacle in a vertical position.

3. In a device of the character described, a column presenting at one side an arc-shaped abutment for an inclined receptacle wall, and a movable supporting member between which and said abutment a frustum-shaped receptacle is adapted to rest, said abutment engaging said receptacle at one part of its periphery and said movable supporting member engaging it at a substantially opposite part of its periphery and intermediate of its ends, said movable supporting member being formed as a loop which engages the receptacle when the loop is swung upwardly and moves to an inoperative receptacle-clearing position by gravity upon the lifting of the receptacle from the position in which it is supported.

In witness whereof, I have hereunto set my hand this 1st day of June, 1931.

ALFRED C. GILBERT.